UNITED STATES PATENT OFFICE.

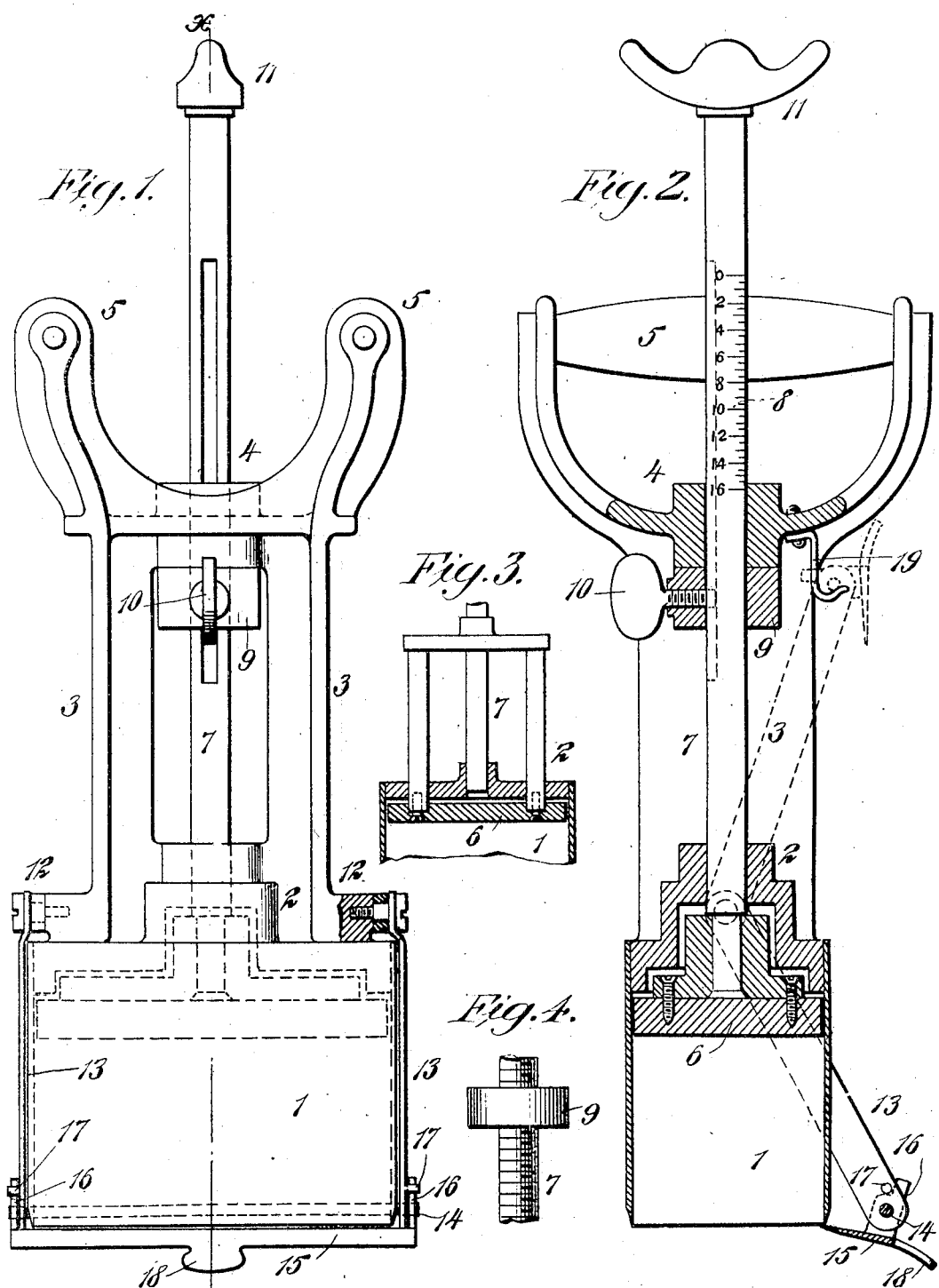

CHARLES F. FOGG, OF NEW YORK, N. Y., ASSIGNOR, BY DIRECT AND MESNE ASSIGNMENTS, TO AUTOMATIC BUTTER-CUTTER-AND-WEIGHER CO., A CORPORATION OF DELAWARE.

BUTTER-CUTTER.

No. 818,757.     Specification of Letters Patent.     Patented April 24, 1906.

Application filed December 7, 1904. Renewed October 10, 1905. Serial No. 282,168.

*To all whom it may concern:*

Be it known that I, CHARLES F. FOGG, a citizen of the United States, residing at New York, in the county of New York and State of New York, have invented certain new and useful Improvements in Butter-Cutters, of which the following is a specification, reference being had therein to the accompanying drawings.

My invention relates especially to devices employed for cutting butter from a tub or other holder in a pat of predetermined weight, and has for its object the provision of a simple, cheap, and effective cutter of the character specified.

To attain the desired end, my invention consists in a butter-cutter in which is comprised a cutting-casing closed at the upper extremity, from opposite sides whereof extend standards provided with horizontal handpieces, said standards being united by a perforated connecting-piece, a plunger within the casing, provided with a graduated operating-rod, said rod bearing a thumb-piece and an adjustable stop-collar, and a swinging blade connected to arms pivoted at the sides of the casing, all of which will be hereinafter first fully described, and then pointed out in the claims.

In the accompanying drawings, forming a part hereof, Figure 1 is a side elevation of my butter-cutter. Fig. 2 is a vertical sectional view thereof at line *x x* of Fig. 1. Fig. 3 is a reduced sectional view illustrating a modified form of attachment between the plunger and its operating-rod, and Fig. 4 shows a modified means of adjustment for the collar on said rod.

Similar numerals of reference, wherever they occur, indicate corresponding parts in all the figures.

1 is the cutting-casing, made of any approved material and provided with a perforated head 2 at its upper extremity. At opposite sides of the casing 1 are upwardly-extending standards 3, connected together by a perforated cross-piece 4 and having horizontal handpieces 5.

6 is a plunger located within the casing 1 and having an operating-rod 7 affixed thereto and extending upward through the perforation in the head 2 and connecting-piece 4. The rod 7 is graduated at 8 to indicate ounces or the equivalent.

9 is a collar adjustably held on the rod 7 below the cross-piece 4 by means of a set-screw 10 or by threading the collar 9 and the rod 7, as illustrated in Fig. 4 of the drawings.

11 is a thumb-piece surmounting the rod 7.

Pivoted at 12 are swinging bars 13, connected together near their lower ends by a rod 14, whereon is pivoted a blade 15 by means of ears 16. The ears 16 are arranged to engage with stops 17 on the bars 13, thus insuring the proper relation of the blade to the open face of the casing 1 when the blade is to be used.

18 is a projection at the back of the blade 15 for holding the same when in use, and when in a raised position the rod engages with a catch 19, as indicated in dotted lines in Fig. 2 of the drawings, while the cutter is being forced into butter.

When constructed and arranged in accordance with the foregoing description, the operation of my improved butter-cutter is as follows: The blade 15 being raised out of the way, the collar 9 is set so as to hold the plunger 6 in position to permit the casing to receive the requisite amount of butter. The casing is now thrust into the mass of butter by means of the two handpieces 5 and, when filled, a twist of the cutter in a rotary direction will sever the contained butter from the mass. The blade 15 is thrown down, as in full lines in Fig. 2 of the drawings, the stops 17 bringing it to the proper position, and by pushing the blade over the mouth of the casing 1 a smooth surface is secured. The blade 15 is now swung back out of the way and secured in place, when by grasping the handpieces 5 and passing the thumbs of each hand over the piece 11 the plunger 6 is easily forced downward, expelling the pat of butter of predetermined size and weight.

Having now fully described my invention, what I claim as new therein, and desire to secure by Letters Patent, is—

1. A butter-cutter in which is comprised a casing closed at its upper extremity, from opposite sides whereof extend standards provided with horizontal handpieces, said standards being united by a perforated connecting-piece; a plunger within the casing provided with a graduated operating-rod, said rod bearing a thumb-piece and an adjustable stop-collar; and a swinging cutter connected to arms pivoted at the sides of the casing and adapted to swing entirely clear of the casing, the whole arranged to operate substantially as shown and described.

2. In a device of the character herein specified, the combination with a cutting-casing, of a cutter and carrying mechanism arranged to pass over the face thereof, or be swung out of the way entirely clear of the casing, substantially as shown and described.

3. In a device of the character herein specified, the combination with a cutting-casing, of a blade pivoted to swinging arms at the sides of the casing, said arms bearing stops, substantially as shown and described.

In testimony whereof I hereto affix my signature in presence of two witnesses.

CHARLES F. FOGG.

Witnesses:
A. M. PIERCE,
C. A. PIERCE.